2,972,561
Patented Feb. 21, 1961

2,972,561
SOIL TREATMENT

Albert J. Suhovecky and Philip H. Santmyer, Florissant, Mo., assignors to Monsanto Chemical Company, St. Louis, Mo., a corporation of Delaware No Drawing. Filed July 6, 1959, Ser. No. 824,910

14 Claims. (Cl. 167—22)

This invention relates to methods of treating soils for the elimination of soil micro-organisms without inhibiting the growth of plants in the soils. More specifically, the invention relates to the control of nematode populations and soil fungus by chemical means.

Isothiocyanates have been proposed for the control of soil fungus and insecticides. Since some of these are phytotoxic, the satisfactory application to soil has not been accomplished. Some non-phytotoxic isothiocyanates have been used, but these are also not sufficiently toxic to nematodes and fungus to enable their use as satisfactory soil treating agents.

The purpose of the present invention is to provide a useful and practical soil treating agent. A further purpose of the invention is to provide a method of freeing soils from plant inhibiting micro-organisms, such as nematodes, fungus or other plant pathogens. A still further purpose is to promote plant growth and increase the productivity of the soil.

In accordance with this invention it has been found that cyanoalkyl isothiocyanates are unusually effective as soil sterilizing agents, especially for the reduction of the population of nematodes and the prevalence of fungus. In this respect they are substantially more effective than the corresponding alkyl isothiocyanates.

The compounds used in the practice of this soil treating procedure are those having the structure:

wherein R is an alkylene radical having from two to fourteen carbon atoms. Examples of compounds for the practice of this invention are:

2-cyanoethyl isothiocyanate
2-cyanopropyl isothiocyanate
6-cyanohexyl isothiocyanate
8-cyano 4,6-dimethyl octyl isothiocyanate
6-cyano 2-ethylhexyl isothiocyanate
14-cyanotetradecyl isothiocyanate
3-cyanoisodecyl isothiocyanate This invention may be practiced by any method which accomplishes dispersion of the cyanoalkyl isothiocyanates in the soil. Any of the well known procedures for effecting this result may be utilized, e.g. by injecting the compound or formulations containing the compound into the soil, by depositing the substances or formulations on the surface of the soil and dispersing them within the soil by any conventional mechanical equipment, and by drenching the soil with a solution or liquid dispersion in water.

The choice of the means of dispersing the toxicants in the soil is within the province of one skilled in the art. If the compounds are volatile as are the lower molecular weight cyanoalkyl isothiocyanates, they may be injected directly into the soil by some pressurized mechanism. At lower levels of application, especially with the less volatile homologues, the treating agents are preferably dissolved or dispersed in a suitable liquid medium, usually water. If the treating agents are not water-soluble, they may be formulated with a suitable emulsifying agent or other surface active agent which will enable a uniform dispersion in water. The use of solutions or dispersions also insures a uniform application of the cyanoalkyl isothiocyanates to the soil being treated.

However the toxicants are formulated, the treatment of the soil must necessarily involve the incorporation of an amount sufficient to destroy the nematodes and fungi. In general, from two to sixty pounds per acre will provide a satisfactory control of soil fungi and nematodes. This represents a concentration of from one to thirty parts per million of soil. Some variations will be observed with different soil types and some differences in rate of application will be dictated by the sensitivity of some plants to the cyanoalkyl isothiocyanates.

The nematocidal compounds may be added to the soil in solid formulations, frequently referred to as dusts, which may contain in addition to the active ingredient diluents or extenders to absorb the readily volatile toxicant and thereby prevent too rapid dissipation, and dispersing agents to prevent local high concentrations. In addition these components facilitate the distribution of the active ingredient in soil or soil waters.

Suitable solid diluents are those which render the compositions dry and permanently free-flowing. Thus hydroscopic materials should be avoided. Effective solid diluents are the finely divided carriers, including the clays such as the kaolinites, the bentonites and the attapulgites; other minerals in natural state, such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and collodial silica. These diluents may represent a substantial portion, for example 50% to 98% by weight of the entire formulation.

Liquid compositions for nematocidal uses may be solutions or liquid dispersions. The choice of the liquid medium will depend to a great extent upon the physical properties of the active ingredient. If the substituted nitriles are water-soluble, the liquid compositions may be merely an aqueous solution. Where the active component is insoluble in water or soluble only to a limited extent, it is frequently desirable to add a small amount of an organic solvent, which can be readily dispersed in the aqueous medium to produce a heterogeneous dispersion of the active ingredient in water.

A valuable class of nematocidal formulations are those wherein there is present a surface active agent, which serves in providing formulations capable of being uniformly distributed in the soil. The surface active agents may be anionic, cationic or non-ionic and include conventional soaps, such as the water-soluble salts of long chain carboxylic acids, the sulfonated animal, vegetable and minerals oils, the quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulations as used, for example less than 10% and frequently as low as 0.05%. In general, concentrations of from 0.5% to 5% are found to be optimum.

Many of the formulations are benefitted by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1% or as much as 20% in order to provide a uniformly distributed formulation which is capable of maintaining its distributed state during storage, use and after application to the soil.

A useful formulation of the nematocidal compositions may involve the solid or liquid concentrate of the active ingredient to which has been added formulation aids or conditioning agents, so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

Further details of the procedures and the benefits to be derived therefrom are set forth in the following specific examples.

EXAMPLE I

Soil infested with fungus was used in growing cotton and cucumber plants from seed. Both ethyl isothiocyanate and β-cyanoethyl isothiocyanate were studied and compared with untreated soil as a control. The candidate toxicants were applied at both 1 and 0.1 part per million parts of soil. The following tabulation shows the percent of healthy plants from each plot studied:

Table I

| Compound | Concentration (parts per million) | Cotton | Cucumber |
|---|---|---|---|
| Ethyl Isothiocyanate | 1 | 20 | 30 |
|  | 0.1 | 23 | 43 |
| Cyanoethyl Isothiocyanate | 1 | 83 | 77 |
|  | 0.1 | 60 | 83 |
| Control |  | 10 | 17 |

These data show that the cyanoalkyl isothiocyanates are very effective fungicides, whereas the corresponding alkyl isothiocyanates are much less effective.

EXAMPLE II

The effect of various cyanoalkyl isothiocyanates on the nematode *Panagrellus redivivis* was measured in vitro by observing the rate of flexing (motility) of the nematode. The average values in the table below represent the estimated percent of rate of normal flexing, zero representing complete kill.

Table II

| Compound | Concentration (percent) | Motility (percent) |
|---|---|---|
| 2-cyanoethyl isothiocyanate | 0.1 | 0 |
|  | 0.01 | 0 |
| 2-methyl-2-cyanoethyl isothiocyanate | 0.1 | 0 |
|  | 0.01 | 0 |
| 1-methyl-2-cyanoethyl isothiocyanate | 0.1 | 0 |
|  | 0.01 | .1 |
| Control |  | 100 |

These experiments demonstrate that the test compounds all effected a complete kill of the nematodes at the higher concentration. However, at dilute concentration of 1-methyl-2-cyanoethyl isothiocyanate very slight motility was observed.

EXAMPLE III

Soil infested with the nematode *Meloidogyne incognita* was used to grow tomato plants. The soil was treated with various concentrations of 2-cyanoethyl isothiocyanates with the following observed results.

Table III

| Concentrate | Remarks |
|---|---|
| 0.1 | No root knots. |
| 0.01 | Do. |
| 0.005 | Slight root infestation. |
| 0.000 (Control) | Very heavy infestation. |

EXAMPLE IV

Various fungi were inoculated in agar containing 6.25 parts per million of one of the several toxicants. After culturing for seven days the mean diameter of the colony was measured in millimeters. The size of the colony is indicative of the degree of inhibition.

Table IV

| Organism | A | B | C | D | Control |
|---|---|---|---|---|---|
| *Verticillium albo-atrum* | 0 | 64.0 | 60.5 | 54.5 | 85.0 |
| *Rhizoctonia solani* | 0 | 0 | 2.5 | 6.5 | 30.0 |
| *Sclerotium rolfsii* | 2.5 | 0 | 17.0 | 54.0 | 88.0 |
| *Phytophthora cinnamomi* | 0 | 0 | 0 | 26.0 | 85.0 |
| *Fusarium oxysporum* F. *niveum* | 0 | 26.5 | 60.5 | 58.0 | 75.0 |
| *Sclerotinia sclerotiorum* | 0 | 0 | 0 | 85.0 | 85.0 |
| *Pythium ultimum* | 0 | 0 | 0 | 0 | 85.0 |

A=2-cyanoethyl isothiocyanate.
B=2-cyanopropyl isothiocyanate.
C=1-methyl-2-cyanoethyl isothiocyanate.
D=6-cyanohexyl isothiocyanate.

EXAMPLE V

In greenhouse experiments cotton and cucumber plants were grown in soil infested with a variety of unidentified soil fungi. Several cyanoalkyl isothiocyanates were incorporated in the different plantings at rates of 2.5, 5 and 10 parts per million of soil. The number of plants growing uninhibited were counted and the efficacy of the several toxicants were compared to untreated plots.

Table V

SOIL FUNGICIDE ACTIVITY SPECTRUM

| Compound | Concentration (p.p.m.) | Fusarium oxysporum | | Pythium ultimum | | Verticillium albo-atrum | | Rhizoctonia solani | |
|---|---|---|---|---|---|---|---|---|---|
|  |  | cotton | cucumber | peas | cucumber | cotton | cucumber | cotton | beans |
| 2-cyanoethyl isothiocyanate | 10 | 80 | 84 | 100 | 68 | 96 | 64 | 1 4 | 100 |
|  | 5 | 92 | 84 | 93 | 88 | 92 | 72 | 60 | 100 |
|  | 2.5 | 80 | 94 | 93 | 92 | 80 | 88 | 64 | 93 |
| 1-methyl-2-cyanoethyl isothiocyanate | 10 | 92 | 92 | 80 | 60 | 80 | 80 | 60 | 100 |
|  | 5 | 20 | 8 | 100 | 72 | 88 | 72 | 80 | 100 |
|  | 2.5 | 16 | 0 | 93 | 92 | 8 | 4 | 96 | 100 |
| 6-cyanohexyl isothiocyanate | 10 | 80 | 88 | 73 | 64 | 80 | 92 | 1 0 | 1 0 |
|  | 5 | 68 | 88 | 93 | 72 | 84 | 84 | 64 | 100 |
|  | 2.5 | 0 | 0 | 67 | 52 | 60 | 96 | 12 | 7 |
| Control |  | 40 | 42 | 30 | 4 | 46 | 50 | 2 | 10 |

[1] This figure is low because of chemical damage caused by the high level of application.
NOTE.—The numbers on the chart indicate the percentage of healthy crops.

While this invention has been described with respect to certain embodiments, it is to be understood that it is not so limited and that further variations and modifications thereof obvious to those skilled in the art may be made without departing from the spirit or scope of this invention.

What is claimed is:

1. The method of improving the productivity of soils, which comprises treating soils infested with organisms of the group consisting of fungi and nematodes, which comprises dispersing in the soil an amount toxic to said organisms of a compound of the structure:

NC—R—NCS wherein R is an alkylene radical having two (2) to fourteen (14) carbon atoms.

2. The method of claim 1 wherein the toxicant is formulated with an inert liquid diluent.

3. The method of claim 1 wherein the toxicant is formulated with an inert solid diluent.

4. The method defined by claim 1 wherein the compound is 2-cyanoethyl isothiocyanate.

5. The method defined by claim 1 wherein the compound is 2-cyano-n-propyl isothiocyanate.

6. The method defined by claim 1 wherein the compound is 1-methyl-2-cyanoethyl isothiocyanate.

7. The method defined by claim 1 wherein the compound is 6-cyanohexyl isothiocyanate.

8. The method defined by claim 1 wherein the compound is 8-cyanoisodecyl isothiocyanate.

9. The method of improving the productivity of infected soils, which comprises treating soil infested with organisms of the group consisting of fungi and nematodes, which comprises dispersing in the soil from two (2) to sixty (60) pounds per acre of a compound of the structure:

NC—R—NCS wherein the R radical is an alkylene radical having two (2) to fourteen (14) carbon atoms.

10. The method defined by claim 9 wherein the compound is 2-cyanoethyl isothiocyanate.

11. The method defined by claim 9 wherein the compound is 2-cyano-n-propyl isothiocyanate.

12. The method defined by claim 9 wherein the compound is 1-methyl-2-cyanoethyl isothiocyanate.

13. The method defined by claim 9 wherein the compound is 6-cyanohexyl isothiocyanate.

14. The method defined by claim 9 wherein the compound is 8-cyanoisodecyl isothiocyanate.

References Cited in the file of this patent

UNITED STATES PATENTS 2,886,584    McKay _____ May 12, 1959